Patented Jan. 11, 1938

2,104,891

UNITED STATES PATENT OFFICE 2,104,891

VAT DYESTUFFS OF THE ACYLAMINOANTHRAQUINONE SERIES CONTAINING A THIAZOLIC RADICAL AND PROCESS OF MAKING SAME

Werner Zerweck and Wilhelm Kunze, Frankfort-on-the-Main-Fechenheim, Germany, assignors to General Aniline Works, Inc., New York, N. Y., a corporation of Delaware No Drawing. Application March 3, 1934, Serial No. 713,950. In Germany March 9, 1933

3 Claims. (Cl. 260—44)

Our invention relates to new vat dyestuffs and a process of making same. The new dyestuffs correspond to the general formula:

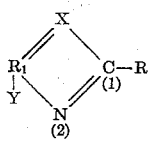

wherein $R_1$ stands for a member of the group consisting of phenylene and naphthylene, X stands for a member of the group consisting of S and O, R stands for a member of the group consisting of alkyl, phenyl and the radical

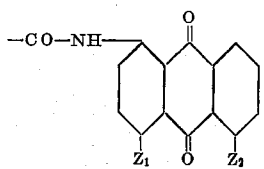

Y stands for a member of the group consisting of hydrogen and the radical

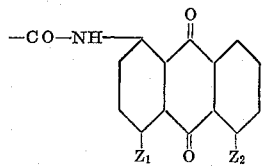

at least one of the letters Y and R representing the aforesaid radical, $Z_1$ standing for a member of the group consisting of hydrogen, a benzoylamino and methoxy radical, $Z_2$ standing for a member of the group consisting of hydrogen and a benzoylamino group, at least one of the Z's representing hydrogen.

The new dyestuffs are obtained by condensing mono- or dicarboxylic acids or functional derivatives thereof of the thiazolic or oxazolic series with α-aminocompounds of the anthraquinone series or by condensing inversely amides of said carboxylic acids with α-halogenated compounds of the anthraquinone series.

The new dyestuffs dye the vegetable fiber yellowish to yellowish red to yellowish brown shades of a good fastness particularly to boiling alkalies. They are superior to the hitherto known dyestuffs by a surprisingly increased fastness to light.

In order to further illustrate our invention the following examples are given; but we wish it, however, to be understood that our invention is not limited to the particular products or reacting conditions stated therein.

Example 1

34.2 parts of monobenzoyl-1.5-diamino-anthraquinone are mixed with 21.5 parts of 1-methylbenzthiazole-5-carboxylic acid chloride and about 600 parts of o-dichlorbenzene and the mixture is heated at about 180° C. for about an hour. When cool the separated dyestuff is filtered off, washed out with alcohol and dried.

The new dyestuff of the formula:

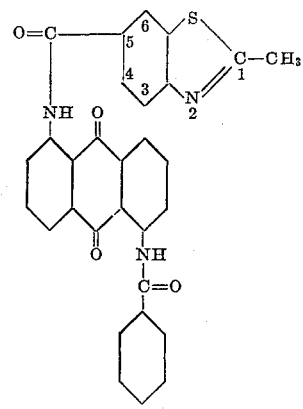

represents a golden yellow powder soluble in concentrated sulfuric acid with a brownish red color, in the alkaline hydrosulfite vat with a violetish gray color. It dyes cotton bright golden yellow shades of a good fastness particularly to light.

When using as one component of condensation the 1-methylbenzthiazole-4-carboxylic acid chloride a similar dyestuff is obtained, which represents a golden yellow powder soluble in concentrated sulfuric acid with a reddish color, in the vat with a violetish gray color. The dyestuff dyes the fiber golden yellow shades of a likewise good fastness.

The said carboxylic acid chlorides are obtainable for instance by heating the corresponding carboxylic acids with the calculated amount of phosphorus pentachloride with the addition of monochlorobenzene at about 100 to 110° C. The 1-methylbenzthiazole-5-carboxylic acid chloride melts in a pure state at 155 to 156° C., the corresponding 4-chloride at 225 to 226° C.

Example 2

A mixture of 22.3 parts of 1-aminoanthraquinone, 28 parts of 1-phenylbenzthiazole-5-carboxylic acid chloride (almost colorless powder of 195 to 198° C. melting point) and about 500 parts of o-dichlorobenzene is heated at about 180° C. for about 1 hour. When cool the crystallizing dyestuff is isolated in the usual manner.

It corresponds to the formula:

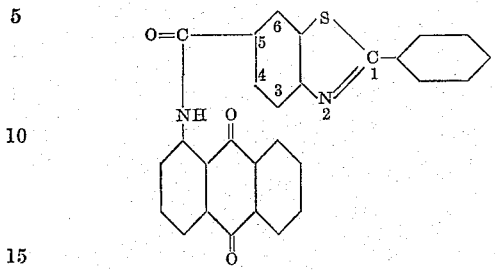

and represents when dry a greenish yellow powder soluble in concentrated sulfuric acid with an orange red color, in the vat with a violet color. It dyes cotton greenish yellow shades of a particular fastness to light and a good fastness to boiling alkalies.

A practically identical dyestuff is obtained by condensing 1-chloroanthraquinone with 1-phenylbenzthiazole-5-carboxylic acid amide, which latter compound is formed by decomposing the chloride with ammonia and represents a slightly reddish powder, crystallizable from water and melting in a pure state at 198 to 199° C.

When using as one reaction component the monobenzoyl-1.5-diaminoanthraquinone and the other 1-phenylbenzthiazole-5-carboxylic acid chloride a dyestuff dyeing cotton bright golden yellow shades of a very good fastness to light and boiling alkalies is obtained.

The condensation of 1-p-chlorophenylbenzthiazole-5-carboxylic acid chloride with monobenzoyl-1.5-diaminoanthraquinone yields a dyestuff, soluble in concentrated sulfuric acid with a brownish color and dyeing cotton golden yellow shades from a grayish blue vat.

*Example 3*

A mixture of 34.2 parts of monobenzoyl-1.5-diaminoanthraquinone, 20 parts of benzthiazole-1-carboxylic acid chloride and about 500 parts of monochlorobenzene is heated for one hour to about 80° C. and then for about 3 hours at about 130° C. The dyestuff thus formed of the formula:

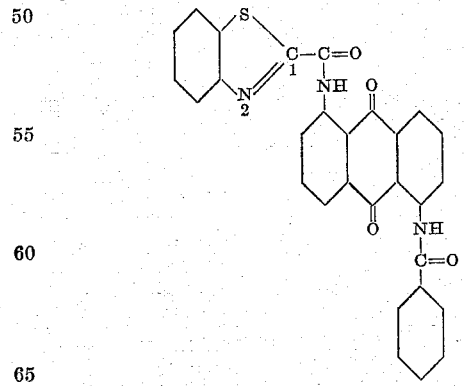

represents when dry a golden yellow powder soluble in concentrated sulfuric acid with a brownish black color and dyeing cotton from a bluish gray vat bright golden yellow shades of a very good fastness to light.

When using as one component the 5-chloro-benzthiazole-1-carboxylic acid chloride or the 4,5,6 - trichlorobenzthiazole - 1 - carboxylic acid chloride dyestuffs are obtained soluble in concentrated sulfuric acid with an olive brown or brown color respectively and dyeing cotton golden yellow shades from a greyish-violet or bluish gray vat respectively.

Similar dyestuffs are formed by condensing monobenzoyl - 1.5 - diaminoanthraquinone with 4.5 - dichloro-benzthiazole - 1 - carboxylic acid chloride or 5-methyl-benzthiazole-1-carboxylic acid chloride or 5,6-benzo-benzthiazole-1-carboxylic acid chloride.

The said carboxylic acid chlorides are for instance obtainable by treating the corresponding acids or alkali metal salts thereof with phosphorus pentachloride or thionylchloride in the presence of monochlorobenzene. They represent almost colorless to slightly yellow crystallized substances. In the pure state the benzthiazole-1-carboxylic acid chloride melts at 98 to 100° C., the 5-chlorocompound at 135 to 138° C., the 4,5-dichlorocompound at 126 to 132° C., the 4,5,6-trichlorocompound at 140 to 141° C., the 5-methyl-compound at 111 to 112° C., the 5,6-benzo compound at 145 to 147° C.

*Example 4*

To 34 parts monobenzoyl-1,4-diaminoanthraquinone about 500 parts of o-dichlorobenzene and at about 120° C. 26 parts of 5-chlorobenzthiazole-1-carboxylic acid chloride are added and the mixture is heated for about one hour at about 180° C. The formed dyestuff is filtered off, washed out and dried. It corresponds to the formula:

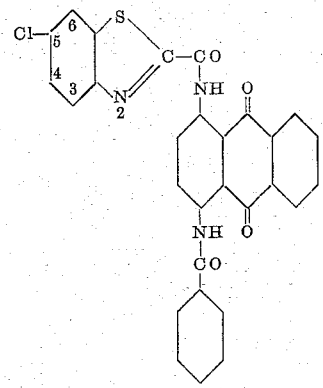

and represents an orange powder soluble in sulfuric acid with a red color and dyeing cotton from a bluish gray vat orange shades of an excellent fastness to light and a very good fastness to chlorine and boiling alkalies.

The same dyestuff is obtained when condensing 1,4-diaminoanthraquinone with one molecular proportion of the said carboxylic acid chloride and converting subsequently the remaining free amino group into the benzoylamino group or when condensing at first the chloride with 1-amino-4-chloroanthraquinone and converting the chlorine atom in the known manner into the benzoylamino group.

A likewise orange dyeing dyestuff is obtained when condensing two molecular proportions of the said carboxylic acid chloride with the condensation product of two molecular proportions of 1,4-diaminoanthraquinone with therephthaloylchloride of the formula:

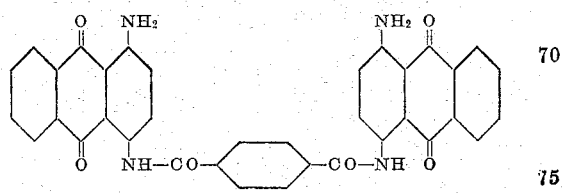

Similar dyestuffs are obtained when using as one reaction component the 5-methyl- or 5-ethoxybenzthiazole-1-carboxylic acid chloride.

When condensing 5.6-benzobenzthiazole-1-carboxylic acid chloride with mono-benzoyl-1.4-diaminoanthraquinone the formed dyestuff dissolves in sulfuric acid with a brown color and dyes cotton from a gray vat yellowish scarlet shades of a particular fastness to light.

Example 5

A mixture of 22.5 parts of 1-aminoanthraquinone and 13 parts of benzthiazole-1.5-dicarboxylic acid dichloride is heated in the presence of o-dichlorobenzene for one hour about 100° C. and then at about 150° C. for about two hours. When cool the condensation product separates and is isolated as usual. The new dyestuff of the formula:

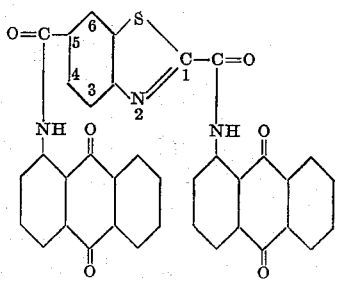

represents when dry a yellow powder soluble in sulfuric acid with a golden yellow color and in the vat with a violetish gray color and dyeing cotton very fast greenish yellow shades.

When condensing the same dicarboxylic acid dichloride with two molecular proportions of 1-amino-4-methoxy-anthraquinone a dyestuff is obtained soluble in sulfuric acid with a reddish color and dyeing cotton from a reddish brown vat yellowish brown shades.

Example 6

A mixture of 22 parts of 1-aminoanthraquinone, 15.5 parts of 5.6-benzobenzthiazole-1.2'-dicarboxylic acid dichloride of the formula:

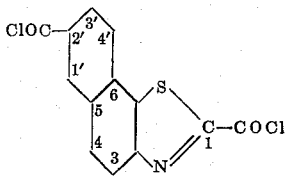

and about 700 parts of dichlorobenzene is heated for some hours at about 150° C. When cool the crystallizing dyestuff is isolated. It corresponds to the formula:

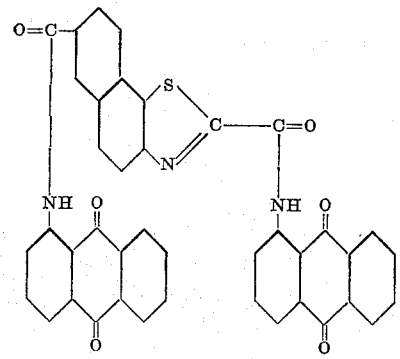

and represents when dry a yellow powder soluble in sulfuric acid with a yellow color and dyeing cotton from a currant like colored vat greenish yellow shades of a very good fastness.

The said dichloride is obtainable by heating for instance the corresponding dicarboxylic acid with phosphorpentachloride in the presence of monochlorobenzene at 120 to 130° C. The dichloride represents a yellow powder of 173 to 175° C. melting point.

Example 7

34.2 parts of monobenzoyl-1.5-diaminoanthraquinone are mixed with 20 parts of benzoxazole-1-carboxylic acid chloride (cf. Skraup and Moser, Ber. d. deutschen Chem. Ges., vol. 55, page 1080) and about 700 parts of o-dichlorobenzene and the mixture is heated at first carefully at 80 to 100° C. then for about two hours at 120 to 130° C. The dyestuff thus formed and isolated of the formula:

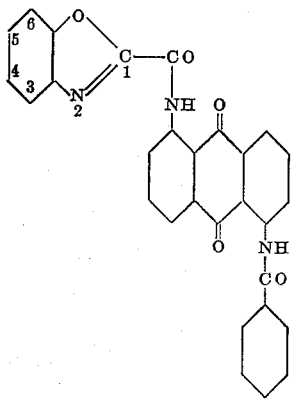

represents when dry a golden yellow powder, soluble in concentrated sulfuric acid with a brown color without splitting up of the oxazolic nucleus. The dyestuff dyes cotton from a grayish vat reddish yellow shades of a good fastness particularly to light.

Example 8

A mixture of 34.2 parts of monobenzoyl-1.5-diaminoanthraquinone, 22 parts of 1-methylbenzoxazole-4-carboxylic acid chloride and about 700 parts of o-dichlorobenzene is heated for two hours at about 150° C. In this manner a dyestuff of the formula:

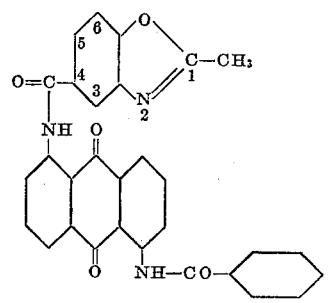

is obtained, representing when dry a golden yellow powder, soluble in concentrated sulfuric acid with a slightly brown color and dyeing cotton from a gray vat clear reddish yellow shades of a very good fastness to light.

When using as one component 1-aminoanthraquinone the formed dyestuff dyes cotton fast greenish yellow shades.

The 1-methylbenzoxazole-4-carboxylic acid, which melts at about 210° C. with decomposition, is for instance obtainable by reacting with acetic acid anhydride on 3-amino-4-hydroxybenzoic acid. The chloride is formed by decomposing the carboxylic acid for instance with thionylchloride with the addition of monochlorobenzene.

*Example 9*

A mixture of 34.2 parts of monobenzoyl-1.5-diaminoanthraquinone, 28 parts of 1-phenyl-benzoxazole-4-carboxylic acid chloride and about 700 parts of o-dichlorobenzene is heated at 170 to 180° C. for about an hour. The dyestuff, which is isolated of the formula:

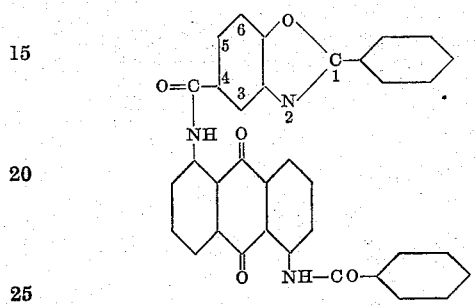

represents a golden yellow crystalline powder, soluble in concentrated sulfuric acid with a slightly brown color. The dyestuff dyes cotton from a violetish gray vat golden yellow shades of a good fastness to light, chlorine and boiling alkalies.

A practically identical dyestuff is obtained by condensing the 1-phenyl-benzoxazole-4-carboxylic acid amide of 211 to 213° C. melting point with 1-chloro-5-benzoylaminoanthraquinone.

By condensing the 1-phenyl-benzoxazole-4-carboxylic acid chloride with 1-aminoanthraquinone a dyestuff is obtained which dyes cotton greenish yellow shades.

The 1-phenyl-benzoxazole-4-carboxylic acid of 266 to 267° melting point is obtainable for instance by heating the 3-amino-4-hydroxybenzoic acid with benzoylchloride in the presence of pyridine. The chloride is obtainable by treating the carboxylic acid with thionylchloride in the presence of monochlorobenzene. It is easily soluble in benzene and melts in a pure state at 130 to 132° C.

*Example 10*

22.5 parts of 1-aminoanthraquinone and 26 parts of 1-methyl-2.3-benzo-benzoxazole-6-carboxylic acid chloride are heated in the presence of o-dichlorobenzene at about 180° C. for about an hour.

The formed dyestuff of the formula:

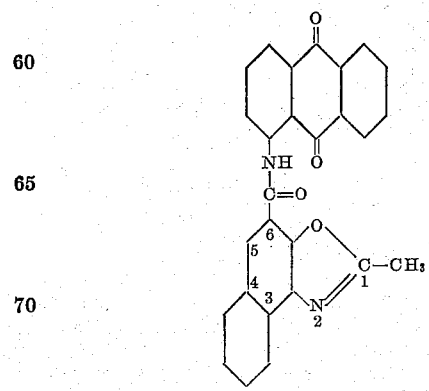

represents greenish yellow crystals, soluble in sulfuric acid with a yellowish brown color and dyeing cotton from a currant like colored vat bright greenish yellow shades of a very good fastness to light.

When using as one component mono-benzoyl-1.5-diaminoanthraquinone a golden yellow dyestuff is formed.

The 1-methyl-2.3-benzo-benzoxazole-6-carboxylic acid of 287 to 288° melting point is for instance obtainable by splitting the azodyestuff from sulfanilic and 2.3-hydroxynaphthoic acid and reacting with acetic acid anhydride on the formed 1-amino-2-hydroxy-3-naphthoic acid. The chloride forms slightly yellow crystals of 137 to 138° C. melting point.

When condensing the 1-methyl-2.3-benzo-benzoxazole-3'-carboxylic acid chloride of 132 to 133° C. melting point of the formula:

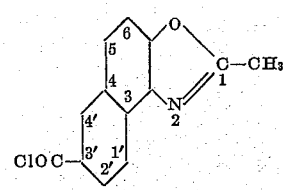

with 1-aminoanthraquinone or mono-benzoyl-1.5-diaminoanthraquinone respectively dyestuffs are obtained dyeing cotton fast greenish or reddish yellow shades respectively.

We claim:

1. Vat dyestuffs of the general formula:

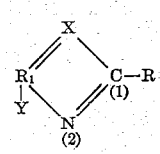

wherein X stands for a member of the group consisting of S and O, $R_1$ stands for a member of the group consisting of phenylene and naphthylene, R stands for a member of the group consisting of alkyl, phenyl and the radical

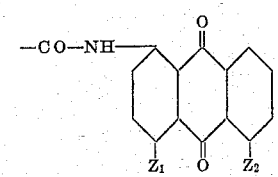

Y stands for a member of the group consisting of hydrogen and the radical

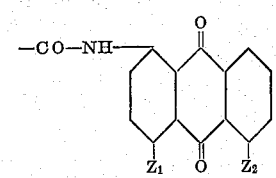

at least one of the letters Y and R representing the aforesaid radical, $Z_1$ standing for a member of the group consisting of hydrogen, a benzoylamino and methoxy radical, $Z_2$ standing for a member of the group consisting of hydrogen and a benzoylamino-group, at least one of the Z's representing hydrogen, which dyestuffs dye the vegetable fiber yellowish to yellowish red to yellowish brown shades of a particular fastness to light.

2. The vat dyestuff of the formula:

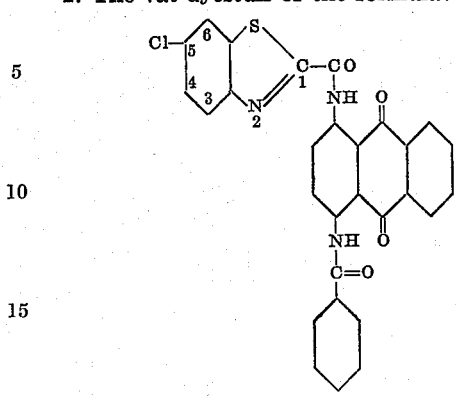

which dyestuff represents an orange powder soluble in sulfuric acid with a red color and dyeing cotton from a bluish gray vat orange shades of an excellent fastness to light and a very good fastness to chlorine and boiling alkalies.

3. The vat dyestuff of the formula:

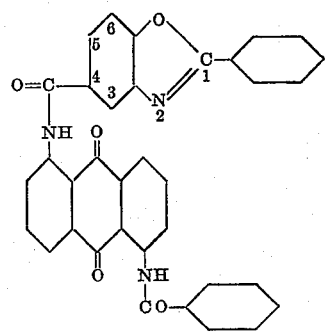

which represents a golden yellow crystalline powder, soluble in concentrated sulfuric acid with a slightly brown color and which dyestuff dyes cotton from a violetish gray vat golden yellow shades of a good fastness to light, chlorine and boiling alkalies.

WERNER ZERWECK.
WILHELM KUNZE.